US00RE34401E

United States Patent [19]

Dudley

[11] E Patent Number: Re. 34,401

[45] Reissued Date of Patent: Oct. 5, 1993

[54] ANIMATED BALLOONS

[75] Inventor: Joseph E. Dudley, Shawnee, Kans.

[73] Assignee: Hallmark Cards, Incorporated, Kansas City, Mo.

[21] Appl. No.: 599,317

[22] Filed: Oct. 17, 1990

Related U.S. Patent Documents

Reissue of:

[64] Patent No.: 4,778,431
Issued: Oct. 18, 1988
Appl. No.: 931,366
Filed: Nov. 14, 1986

[51] Int. Cl.[5] ..... A63H 27/10
[52] U.S. Cl. ..... 446/221; 446/223
[58] Field of Search ..... 446/220, 221, 222, 223, 446/224, 225, 226

[56] References Cited

U.S. PATENT DOCUMENTS

| | | | |
|---|---|---|---|
| 1,523,272 | 1/1925 | Mulholland | 446/221 |
| 2,753,658 | 7/1956 | Stickley | 446/223 |
| 2,826,000 | 3/1958 | Fischman et al. | 446/221 X |
| 2,840,948 | 7/1958 | Stickley | 446/223 |
| 3,591,975 | 7/1971 | Terc | 446/225 |
| 4,038,777 | 8/1977 | Schwartz | 446/225 |

*Primary Examiner*—Mickey Yu
*Attorney, Agent, or Firm*—Leydig, Voit & Mayer

[57] ABSTRACT

A balloon containing a volume of lighter than air gas sufficient to render it buoyant has attached to it self-adjusting expandable or collapsible spring-like member in order to counteract the buoyancy of the balloon and retain it at an essentially stationary vertical position.

16 Claims, 1 Drawing Sheet

ANIMATED BALLOONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the general field of balloons used for other than scientific or conveyance purposes; i.e. the field of those used for decorative, novelty, advertising or amusement purposes.

2. Brief Description Of The Prior Art

Balloons of all sorts have been used for many years for decorative, novelty, advertising and amusement purposes, and such balloons have been fabricated in a variety of shapes, have been adorned with various types of attachments, have been made with multicolored materials, and have had printed on them a wide range of messages, greetings, designs and the like. The materials out of which they have been constructed, however, have not varied to any significant extent. That is to say, most such balloons are simply seamless vessels fabricated of elastomeric materials into which a gas such as air or helium is discharged in order to inflate the vessel, therefore stretching it to many times its uninflated size.

One characteristic of these elastomeric materials is, however, a permeability to lighter than air gases, such as the helium commonly used to inflate such balloons to give them buoyancy in air. As a result, balloons of the sizes normally employed for the recited purposes ordinarily lose their buoyancy within a matter of hours. More significantly, balloons made of such elastomeric materials may, even if uniform in uninflated size, be inflated with varying amounts of air or other gas, depending on the degree to which the material is stretched during inflation.

More recently, however, a popular type of balloon used for these purposes has been the so-called "permanently buoyant" type. Rather than being constructed as a seamless vessel of elastomeric material, the permanently buoyant balloon is constructed as a substantially gas impermeable envelope filled with a lighter than air gas at about atmospheric pressure. Ordinarily, this envelope is formed of sheets of a composite material which are continuously sealed along their edges, and which have a continuous opaque coating of vapor deposited aluminum on at least one side. These composite materials have at least one nonelastomeric polymer film layer, and balloons so constructed are therefore not subject to stretching when inflated.

Among the nonelastomeric polymer materials known in the prior art for use in the at least one film layer of such ballons are polyolefins, such as polyethylene and polypropylene; polyvinylidene chloride (saran); polyester; polyvinyl chloride (PVC); cellophane; polyvinyl alcohol (PVA); regenerated cellulose; polyurethane; ethylene vinyl acetate copolymer (EVA); polyamides and polynitriles.

SUMMARY OF THE INVENTION

It has been noted that a fully inflated balloon of the permanently buoyant type will hold a fixed amount of, for example, a lighter than air gas such as helium. The buoyancy of each of a number of identically sized balloons will therefore be essentially identical upon the full inflation of each such balloon. It has therefore been discovered that an amusement device may be constructed by attaching decorative items having a predetermined effective weight attached to the surface of such a balloon in order to counteract the predictable buoyancy of a balloon of a predetermined size, thus causing the balloon to float in an anchored equilibrium position.

Further, it has been discovered that when such decorative items comprise one or more spring-like reversibly collapsible members which have a sufficient resiliency, a reciprocating motion of such members may be initiated when the balloon is displaced from its anchored equilibrium position by being pushed by hand or by a current of air. This reciprocating motion of the reversibly collapsible spring-like members in turn causes the balloon to oscillate about its anchored equilibrium position in response to the forces exerted on it by the attached reversibly collapsible members. The result of the combination of the reciprocating motion of the reversibly collapsible members and the induced oscillating motion of the balloon is to give the entire structure the unexpected appearance of animation. Thus, the decorative items attached to the balloon may not only anchor it sufficiently to prevent its escape from its owner due to the buoyancy of the helium, but also enhance the entertainment value of the balloon by rendering it capable of apparent animated motion within a confined area.

The material preferred for use in the construction of the reversibly collapsible members is known as "honeycomb" paper. Honeycomb paper is constructed of a stack of multiple layers of thin tissues paper, each layer connected to the two layers above and below it along one or more lines or at one or more points in such a manner that each layer of tissue paper is free to flex between connecting lines or points to generate a spring-like action. The uppermost and lowermost layers may be attached to a stiffer paper or paperboard backing, provided that the additional weight contributed by such backing does not result in overcoming the buoyancy of the gas-filled balloon to which it is later attached. This backing is customarily provided with an adhesive surface for attachment either to the backing at the opposite end of the stack or to another surface. In one preferred form of the present invention, however, the honeycomb is not provided with a backing. Instead, the uppermost and lowermost tissue layers have adhesive applied directly to them for securing the honeycomb to the balloon.

The concept of effective weight, as it applies to the construction of the amusement devices of the invention, may be understood by reference to the characteristics of the preferred honeycomb paper material. Unless the system made up of the balloon(s) and its attachment(s) is in perfect equilibrium, a condition not necessary to the practice of this invention, when one end of the honeycomb paper is attached to the balloon, the opposite end stretches downward until it rests upon a surface. A number of layers of the tissue paper of which the honeycomb is composed will then stack up upon the lowermost layer (or backing, if present), until a state of anchored equilibrium is reached. The effective weight of the honeycomb paper attachment will then be the weight of only those layers of paper which do not rest in the stack supported by the surface. The structure will then appear to stand on the surface, held upright by the buoyant force of the balloon.

When the balloon is displaced from its original equilibrium position by, for example, a downward force applied to the upper surface of the balloon, and then released, the balloon will move upward on account of its buoyancy. As it moves upward, it will travel past its original equilibrium position, and, in so doing, will pull with it additional paper layers of the honeycomb, thereby increasing the effective weight of the honeycomb. This upward travel will continue until the effective weight of the honeycomb is sufficient to counteract the buoyancy of the balloon, at which time the balloon will be drawn downward. As the balloon travels downward, successive layers of the honeycomb paper will, instead of being held airborne, come to rest on a surface, thereby decreasing the effective weight of the honeycomb. As the effective weight of the honeycomb decreases, it reaches magnitude at which it is no longer sufficient to overcome the buoyancy of the balloon, and the balloon then begins to travel upward again. This alternately upward and downward travel of the balloon continues in ever decreasing upward and downward displacement such that the balloon oscillates about its anchored equilibrium position until, in a still atmosphere, it comes to rest at its anchored equilibrium position. Of course, the application of lateral or angular forces to the balloon will produce movement in a fashion corresponding to that described with respect to a downward force.

The resiliency of the honeycomb paper structure itself contributes to the oscillating motion by acting as a spring-like member which counteracts the buoyancy of the balloon when stretched.

It has been further discovered that such amusement devices may be constructed of both upper and lower buoyant balloons joined by a first reversibly collapsible member having one end attached to an upper surface of the lower balloon and having the other end attached to a lower surface of the upper balloon, and, at least one second reversibly collapsible member attached to a lower surface of the lower balloon, where the second collapsible member has an effective weight sufficient to exert on the lower balloon a downward force of at least a magnitude sufficient to cause the amusement device to float at an anchored equilibrium position. Again, where the first and second collapsible members have sufficient resiliency, a reciprocating motion of the first and second collapsible members may be effected upon the displacement of the amusement device from its anchored equilibrium position.

In its state of anchored equilibrium, the amusement device of the invention may be made to assume the form of an animal or other creature by the appropriate arrangement of one or more of each of the component balloons and collapsible members, the number of possible configurations being limited only by the imagination of the constructor. The degree to which the amusement device may be made to resemble the form of an animal or other creature may be enhanced by the addition of printed matter to the surfaces of the balloons themselves, and by the alteration of the size, color and configuration of the honeycomb paper attachments. For example, in a two-balloon device, four cylindrical pieces of honeycomb may be attached to the underside if the lower balloon in order to simulate legs, while another piece of honeycomb may join the lower to the upper balloon in order to simulate the neck and head of a creature. As recited above, the result of the combination of the reciprocating motion of the reversibly collapsible members and the induced oscillating motion of the balloon is to give the entire structure the appearance of animation, thus further enhancing the resemblance of the amusement device of the invention to an animal or other creature.

The device of the invention may, of course, be made to resemble other objects, or to serve a decorative or advertising function, by the appropriate alteration and configuration of its components.

Thus, as may be gleaned from the foregoing, it is a principal object of the invention to provide an amusement device including at least one permanently buoyant balloon and having the ability to remain in an equilibrium position.

Another object is to provide an amusement device including reversibly collapsible members attached to a permanently buoyant balloon which cooperate with the balloon to effect an oscillating motion of the device in order to simulate animation.

Other objects and advantages of the present invention will be apparent from the appended drawings and from the following detailed description.

DETAILED DESCRIPTION

Figure 1:
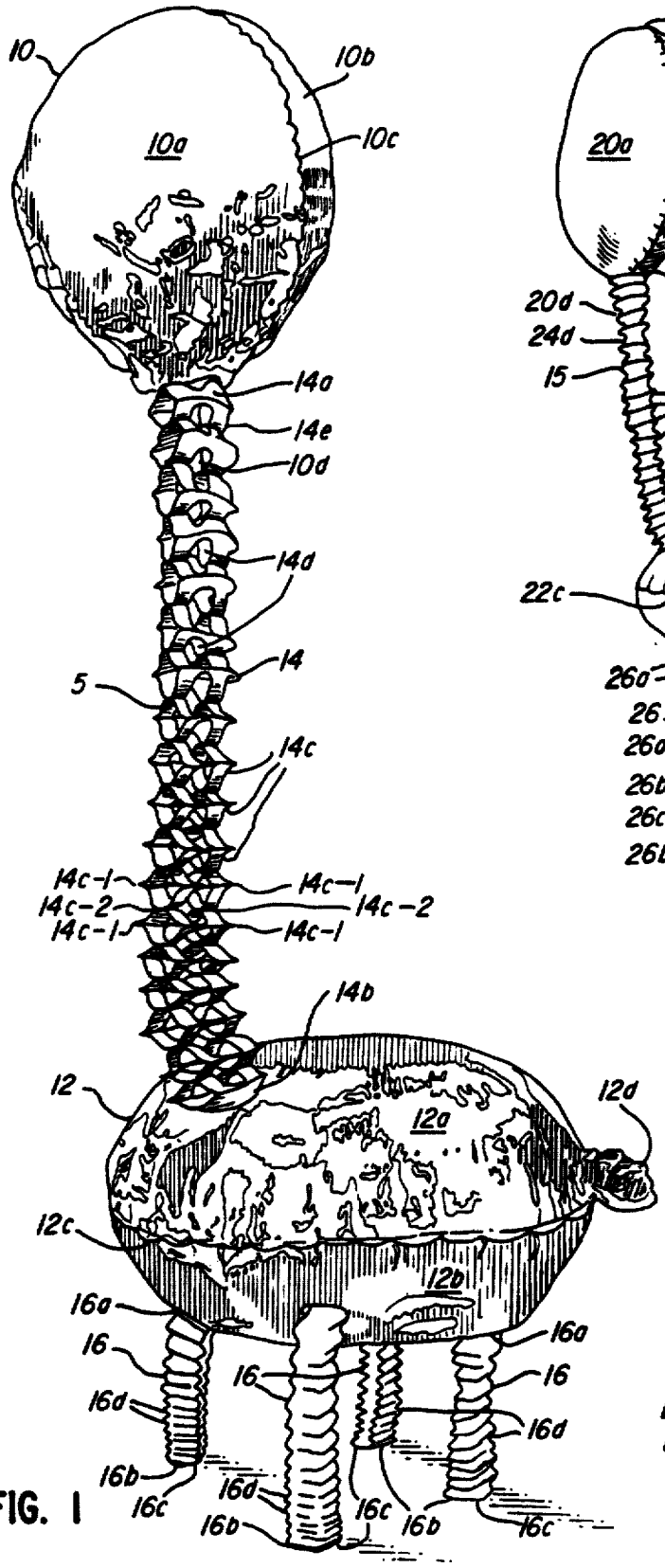
FIG. 1 of the drawings depicts a two-balloon device constructed in accordance with the present invention to simulate the appearance of a four-legged creature.

Referring first to FIG. 1 of the drawings, a first embodiment of a two-balloon device 5 is depicted. Lower balloon 12 is oriented with its seam 12c disposed along a horizontal axis, and it has attached to its lower surface 12b four cylindrical paper honeycomb appendages 16 by means of adhesive ends 16a. These four appendages 16, comprising paper layers 16d and backing paper 16c attached to ends 16b, are arranged on the lower surface 12b of lower balloon 12 so that the combination resembles the body and legs, respectively, of a creature. This is done by aligning the legs along parallel horizontal axes, which are in turn parallel to the axis defined by the fill end 12d of lower balloon 12. Fill end 12d then has the appearance of being the tail of the creature.

Attached to upper surface 12a of lower balloon 12 along the axis defined by fill end 12d, but at the side opposite fill end 12d, is a larger diameter piece of honeycomb paper 14 having upper adhesive end 14a and lower adhesive end 14b. Honeycomb 14 is, as shown, attached near to, but not on, seam 12c of lower balloon 12 by means of lower adhesive end 14b. Upper adhesive end 14a is secured to upper balloon 10 along seam 10c, thus giving honeycomb paper 14 the appearance of the neck of the creature. In order to obtain a more full extension of the neck so formed, an aperture 14d is cut into each paper layer 14c of honeycomb 14. In addition, fill end 10d of upper balloon 10 may be accommodated within cylindrical passage 14e formed by apertures 14d of honeycomb 14 so as to permit upper balloon 10 to more closely resemble the head of the creature. Preferably, seam 10c of upper balloon 10 is oriented along a plane perpendicular to the plane defined by seam 12c of lower balloon 12, so that front surface 10a is made to resemble a face and back surface 10b the back of the head. Appropriate printed matter may be added to both front surface 10a and back surface 10b to enhance the desired effect.

Details of the construction of cylindrical honeycomb paper appendage 14 may also be seen by reference to FIG. 1. Each of the multiple paper disc layers 14c is attached to the two layers above and below it over multiple surfaces; two circular segments 14c-1 lying at opposed edges of the disc and two elongated area 14c-2 lying substantially along the diameter of the disc which lies between the circular segments. For any given paper disc layer 14c, segments 14c-1 will be attached to corresponding segments of the disc lying on one side, while elongated areas 14c-2 will be attached to corresponding elongated areas of the disc lying on the opposite side.

Figure 2:
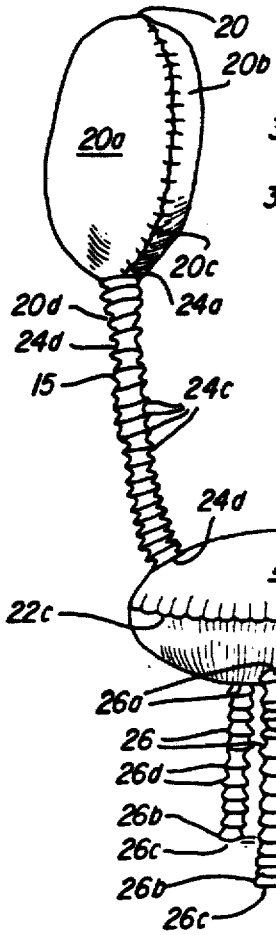
FIG. 2 of the drawings depicts a second embodiment of a two-balloon device constructed in accordance with the present invention to simulate the appearance of a two-legged creature.

Referring next to FIG. 2 of the drawings, an alternative embodiment of a two-balloon device 15 is depicted. Lower balloon 22 is oriented with its seam 22c disposed along a horizontal axis, and it has attached to its lower surface 22b two cylindrical honeycomb paper appendages 26 by means of adhesive ends 26a. These two appendages 26, comprising paper layers 26d and backing paper 26c attached to ends 26b, are arranged on the lower surface 22b of lower balloon 22 so that the combination resembles the body and legs, respectively, of a bird-like creature. This is done by aligning the legs along a horizontal axis which is perpendicular to the axis defined by the fill end 22d of lower balloon 22. Fill end 22d then has the appearance of being the tail of the bird-like creature.

In a manner similar to that employed in the embodiment depicted in FIG. 1, attached to upper surface 22a of lower balloon 22 along the axis defined by fill end 22d, but at the side opposite fill end 22d, is a larger diameter piece of honeycomb paper 24 having upper adhesive end 24a and lower adhesive end 24b. Honeycomb 24 is, as shown, attached near to, but not on, seam 22c of lower balloon 22 by means of lower adhesive end 24b. Upper adhesive end 24a is secured to upper balloon 20 along seam 20c, thus giving honeycomb 24 the appearance of the neck of the creature. In order to obtain a more full extension of the neck so formed, an aperture 24d is cut into each paper layer 24c of honeycomb 24. In addition, fill end 20d of upper balloon 20 may be accommodated within cylindrical passage 24e formed by apertures 24d of honeycomb 24 so as to permit upper balloon 20 to more closely resemble the head of the creature. Preferably, seam 20c of upper balloon 20 is oriented along a plane perpendicular to the plane defined by seam 22c of lower balloon 22, so that front surface 20a is made to resemble a face and back surface 20b the back of the head. Alternatively, seam 20c of upper balloon 20 may be oriented along a plane parallel to the plane defined by seam 22c of lower balloon 22 in order to achieve the appearance of a narrow, elongated head such as might be characteristic of a bird-like creature. As in the case of the embodiment depicted in FIG. 1, appropriate printed matter may be added to what would then become side surfaces 20a and 20b to enhance the desired effect.

Figure 3:
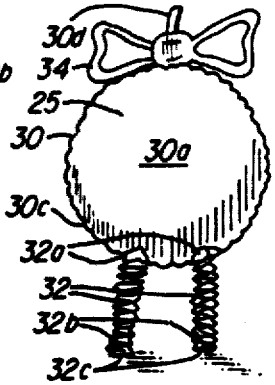
FIG. 3 of the drawings depicts a single-balloon device constructed in accordance with the present invention to simulate the appearance of a second type of two-legged creature.

Depicted in FIG. 3 of the drawings is a single-balloon embodiment 25 of the invention. In this embodiment, balloon 30 is oriented so that its seam 30c defines a vertical plane, and so that fill end 30d lies on the vertical axis of balloon 30. Attached by means of adhesive upper ends 32a to balloon 30 along the lower portion of seam 30c are two cylindrical pieces of honeycomb 32, further comprising paper layers 32d and backing paper 32c attached to lower ends 32b. The two cylindrical pieces of honeycomb 32 are spaced along seam 30c so as to give the appearance of being the legs of a second type of two legged creature. In addition, a decorative bow attachment 34 is secured to balloon 30 by inserting fill end 30d of balloon 30 through slots 34a of said bow 34.

Figure 4:
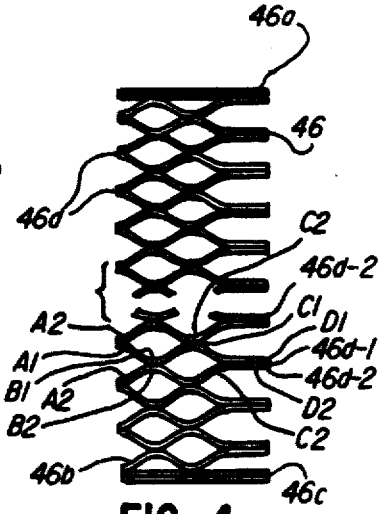
FIG. 4 depicts one example of the honeycomb paper anchor structure employed in the construction of the embodiments of the invention depicted in FIGS. 1–3.

Finally, referring to FIG. 4 of the drawings, the details of the construction of a cylindrical honeycomb paper anchor, corresponding to those having reference numerals 16, 26, and 32 of FIGS. 1, 2, and 3, respectively, may be seen from a side elevation. A stack of a plurality of paper disc layers 46d lies between adhesive end 46a and lower end 46b of anchor 46. In addition, lower end 46b has attached thereto an optional layer of backing paper 46c. In this particular construction, which is of course only one example, paper disc layers 46d are attached to each other in two alternating fashions such that for convenience paper disc layers attached in the first manner are referred to as 46d-1 and paper disc layers attached in the second manner are referred to as 46d-2. Paper disc layers 46d-1 are attached at four areas, A1, B1, C1, and D1 to the two paper disc layers 46d-2 above and below them at corresponding areas A2, B2, C2, and D2. Area A1 of layer 46d-1 is attached to the area A2 of the layer 46d-2 lying above layer 46d-1, areas A1 and A2 being circular sectors of paper disc layers 46d-1 and 46d-2 respectively. Area B1 of layer 46d-1, being defined by two spaced substantially parallel chords of the circle defined by the disc and which chords are in turn substantially parallel to the chord defining sector A1, is attached to area B2 of the layer 46d-2 lying below layer 46d-1. Area C1 of layer 46d-1 is attached to area C2 of the layer 46d-2 lying above it in the manner just described with respect to areas B1 and B2. Finally, area D1 of paper disc layer 46d-1 is attached to area D2 of the layer 46d-2 lying below it, areas D1 and D2 being circular sectors of paper disc layers 46d-1 and 46d-2 respectively.

Before attachment to a balloon the cylindrical honeycomb paper exists as a flat thick disc, all of the paper disc layers lying face to face in an uninterrupted stack. However, when the cylindrical honeycomb paper anchor is attached to an air buoyant balloon, or when it is stretched lengthwise by hand, its paper disc layers are distorted out of their normal planar shape. Removal of the buoyant or stretching force, however, will result in the cylindrical honeycomb paper anchor returning to its disc configuration as a consequence of the inherent resiliency of the structure.

While the present invention has been described by reference to certain specific embodiments depicted in the drawings and explained in the foregoing description, many variations, alternatives and modifications of these embodiments will be apparent to one of ordinary skill in the art to which this subject matter pertains. For example, while the best mode for practicing the invention is to employ balloons of the permanently buoyant type, the principles disclosed, including the use of anchor means having resiliency sufficient to give the appearance of animation, are equally applicable to the use of conventional elastomeric balloons, though such embodiments will have decreased longevity. Accordingly, the scope of the present invention is not to be deemed to be limited to the embodiments described, but instead extends to all such variations, modifications and alternatives coming within the scope of the appended claims.

I claim:

1. In combination:

upper and lower air buoyant balloons comprising substantially gas impermeable envelopes filled with a lighter than air gas at about atmospheric pressure, a first reversibly collapsible spring-like member having one end attached to an upper surface of said lower balloon and having the other end attached to a lower surface of said upper balloon, and, at least one second reversibly collapsible spring-like member attached to a lower surface of said lower balloon, said second collapsible spring-like member having an effective weight sufficient to exert on said lower balloon a downward force of at least a magnitude sufficient to cause said upper and lower air buoyant balloons to float at an equilibrium position, and said first and second collapsible spring-like members having a resiliency sufficient to effect a reciprocating motion of said first and second collapsible spring-like members upon the displacement of either balloon from its equilibrium position.

2. The combination of claim 1, said substantially gas impermeable [envelope] *envelopes* being formed of sheets of a composite material continuously sealed along the edge portions thereof and having a continuous opaque coating of vapor deposited aluminum on at least one side thereof, said composite material having at least one nonelastomeric polymer film layer.

3. The combination of claim 1, said spring-like members being uniformly collapsible throughout their length, thereby permitting the effective vertical drag on said ballons to decrease in response to and in proportion to any decease in buoyancy of said ballons.

4. The combination of claim 1, said spring-like members comprising a plurality of paper disc layers, each of said paper disc layers being attached to a first adjacent paper disc layer at at least two points and being attached to a second adjacent paper disc layer at at least one point.

5. The combination of claim 4, each of said paper disc layers being attached to a first adjacent paper disc layer over at least two circular segments and being attached to a second adjacent paper disc layer over at least one elongated area.

6. The combination of claim 4, each of said paper disc layers being attached to a first adjacent paper disc layer over at least one circular segment and over at least one elongated area, and being attached to a second adjacent paper disc layer over at least one circular segment and over at least one elongated area.

7. The combination of claim 1, said spring-like member comprising a paper assembly repetitively articulated along its length to create a variable resistance to extension thereof and to create a spring-like action in opposition to the buoyancy of said balloons.

8. The combination of claim 4, each of said paper disc layers having a central aperture and being attached to a first adjacent paper disc layer over at least two circular segments and being attached to a second adjacent paper disc layer over two elongated areas.

9. The combination of claim 1 having at least two reversibly collapsible members attached to the surface of said lower balloon at pre-selected locations for simulating the appearance of appendages.

10. The combination of claim 1 further comprising at least one decorative attachment secured to at least one of said upper and lower balloons.

[11. The combination of claim 1, said substantially gas impermeable envelopes being formed of sheets of a composite material continuously sealed along the edge portions thereof and having a continuous opaque coating of vapor deposited aluminum on at least one side thereof, said composite material having at least one nonelastomeric polymer film layer.]

12. In combination:

upper and lower air buoyant balloons comprising substantially gas impermeable envelopes filled with a lighter than air gas at about atmospheric pressure, said envelopes being formed of sheets of a composite material continuously sealed along the edge portions thereof and having a continuous opaque coating of vapor deposited aluminum on at least one side thereof, said composite material having at least one nonelastomeric polymer film layer;

a first reversibly collapsible spring-like member having one end attached to an upper surface of said lower balloon and having the other end attached to a lower surface of said upper balloon, and, at least one second reversibly collapsible spring-like member attached to a lower surface of said lower balloon;

at least one decorative attachment secured to at least one of said upper and lower air buoyant balloons;

at least one of said upper and lower balloons having decorative matter printed on the exterior surface thereof, said second collapsible spring-like member having an effective weight sufficient to exert on said lower balloon a downward force of at least a magnitude sufficient to cause said balloons to float at an equilibrium position, and said first and second collapsible spring-like members having a resiliency sufficient to effect a reciprocating motion of said first and second collapsible spring-like members upon the displacement of either balloon from its equilibrium position.

*13. In combination:*

*first and second balloons comprising substantially gas impermeable envelopes, said first balloon being filled with a lighter than air gas at about atmospheric pressure;*

*a first reversibly collapsible spring-like member having one end attached to said first balloon and having the other end attached to said second balloon; and*

*at least one second reversible collapsible spring-like member attached to said second balloon,*

*said second reversibly collapsible spring-like member having an effective weight sufficient to exert on said first balloon an effective weight sufficient to cause said first balloon to float at an equilibrium position and said spring-like member having a resiliency sufficient to effect a reciprocating motion of said second collapsible spring-like member upon the displacement of said first balloon from its equilibrium position.*

*14. The combination of claim 13 wherein said second balloon is filled with a lighter than air gas at about atmospheric pressure.*

*15. The combination of claim 13 wherein said substantially gas impermeable envelopes are formed of sheets of composite material continuously sealed along the edge*

*portions thereof and having a continuous opaque coating of vapor deposited aluminum on at least one side of each of said gas impermeable envelopes, said composite material having at least one nonelastomeric film layer.*

*16. An amusement device comprising:*

*first and second balloons comprising substantially gas impermeable envelopes, said first balloon being filled with a lighter than air gas at about atmospheric pressure;*

*a first reversibly collapsible spring-like member having one end attached to said first balloon and having the other end attached to said second balloon; and*

*at least one second reversible collapsible spring-like member attached to said second balloon,*

*said second reversibly collapsible spring-like member having an effective weight sufficient to exert on said first balloon an effective weight sufficient to cause said first balloon to float at an equilibrium position and said spring-like member having a resiliency sufficient to effect a reciprocating motion of said second collapsible spring-like member upon the displacement of said first balloon from its equilibrium position.*

*17. In combination:*

*at least a pair of spaced apart balloons comprising substantially gas impermeable envelopes filled with a lighter than air gas at about atmospheric pressure, at least one of said balloons being air bouyant,*

*a first reversibly collapsible spring-like member having its ends attached respectively to said balloons, and*

*at least one second reversibly collapsible spring-like member attached to the other of said balloons,*

*said second collapsible spring-like member having an effective weight sufficient to exert on said air buoyant one of said balloons a downward force of at least a magnitude sufficient to cause said balloons to be maintained at an equilibrium position,*

*and said first and second collapsible spring-like members having a resiliency sufficient to effect a reciprocating motion of said first and second collapsible spring-like members upon the displacement of either balloon from its equilibrium position.*

* * * * *